United States Patent
Ramsey

(10) Patent No.: US 6,550,791 B2
(45) Date of Patent: Apr. 22, 2003

(54) MULTI-PURPOSE CART

(76) Inventor: William Aaron Ramsey, 5129 Tabbs Creek La., Oxford, NC (US) 27565

( * ) Notice: Subject to any disclaimer, the term of this patent is extended or adjusted under 35 U.S.C. 154(b) by 102 days.

(21) Appl. No.: 09/732,422

(22) Filed: Dec. 7, 2000

(65) Prior Publication Data

US 2002/0070517 A1 Jun. 13, 2002

Related U.S. Application Data

(60) Provisional application No. 60/169,897, filed on Dec. 10, 1999.

(51) Int. Cl.⁷ .............. B62B 1/00; B62B 7/02; B62B 11/00; B62B 3/00; B62C 1/00
(52) U.S. Cl. .............. 280/47.19; 280/47.33; 280/47.35; 280/63; 280/47.26
(58) Field of Search ............ 280/47.19, 47.26, 280/47.33, 47.35, 63, 47.32, 78, 659; D22/147, 148

(56) References Cited

U.S. PATENT DOCUMENTS

| | | | | |
|---|---|---|---|---|
| 2,564,996 A | * | 8/1951 | Rasbach .................. 280/47.35 |
| 3,531,136 A | * | 9/1970 | Mobley ................... 280/47.19 |
| D246,359 S | * | 11/1977 | Powers et al. ........... 280/47.35 |
| 4,337,966 A | * | 7/1982 | Stevens ................... 280/47.33 |
| 4,350,366 A | * | 9/1982 | Helms ..................... 280/47.26 |
| 4,355,818 A | * | 10/1982 | Watts ..................... 280/47.19 |
| 4,789,180 A | * | 12/1988 | Bell ....................... 280/47.26 |
| 4,824,137 A | * | 4/1989 | Bolden .................... 280/47.26 |
| 4,989,816 A | * | 2/1991 | Lamarche ............. 248/231.61 |
| 4,998,742 A | * | 3/1991 | Maynard ................. 280/47.35 |
| D341,238 S | * | 11/1993 | Sloan, III ............... 280/47.19 |
| D381,172 S | * | 7/1997 | Jackson et al. .......... 280/47.26 |
| 5,752,634 A | * | 5/1998 | Kortman .................. 280/645 |
| 5,853,189 A | * | 12/1998 | Swartzlander ............ 280/659 |
| D410,784 S | * | 6/1999 | Sandford et al. ........... D34/24 |
| 6,082,757 A | * | 7/2000 | Lin ......................... 280/47.33 |
| 6,164,671 A | * | 12/2000 | Darling, III ............. 280/47.19 |
| 6,264,219 B1 | * | 7/2001 | Smith ..................... 280/47.35 |

* cited by examiner

Primary Examiner—Paul N. Dickson
Assistant Examiner—Joselyn Y Sliteris
(74) Attorney, Agent, or Firm—Mills Law Firm PLLC

(57) ABSTRACT

A fishing cart for carrying a plurality of fishing rods, and tackle gear from a first site to a fishing site, said fishing cart includes a tubular frame for carrying gear and supplies and tubular sleeves on the outside of the frame for carrying fishing rods. The frame is provided with removable wheels and a releasable towing handle for moving the cart between locations. An auxiliary work table may be supported on the sleeves. The cart may be disassembled for compact storage and vehicle transportation and readily assemble at the fishing site.

8 Claims, 7 Drawing Sheets

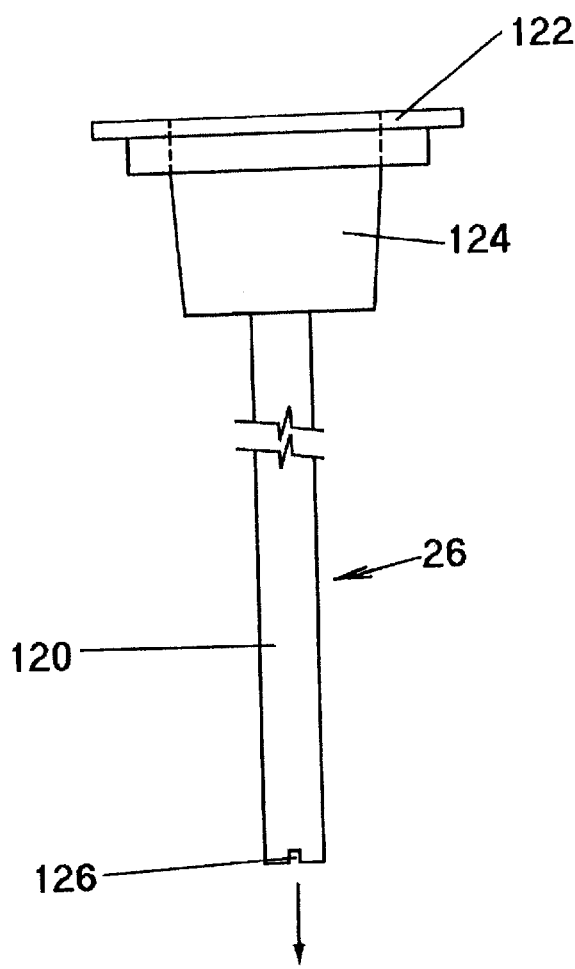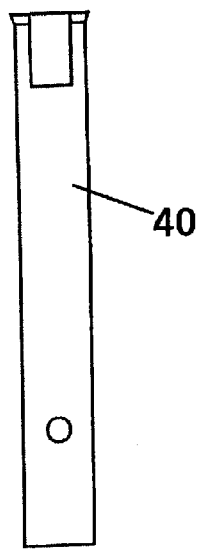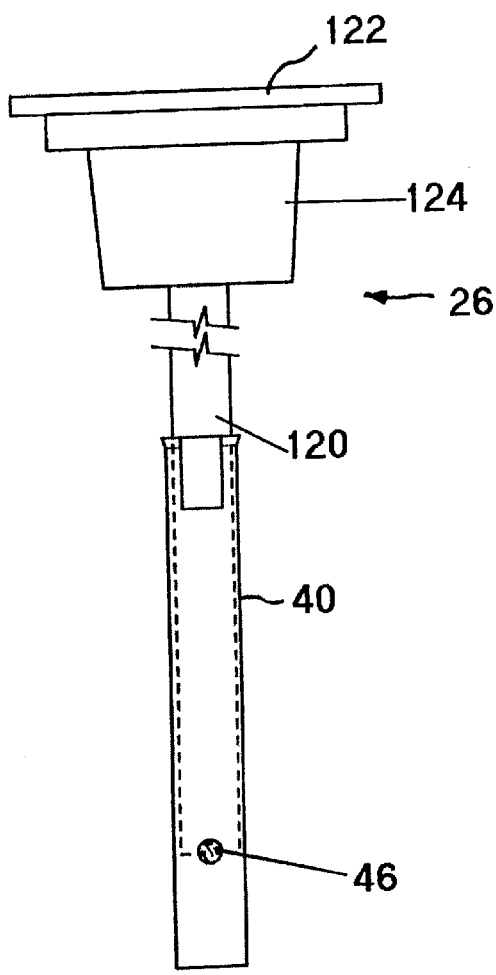
FIG. 6A  FIG. 6B

US 6,550,791 B2

MULTI-PURPOSE CART

RELATED APPLICATION

This application claims benefit under 35 USC 119 of U.S. Provisional Application 60/169,897 filed on Dec. 10, 1999 in the name of Aaron Ramsey and entitled "Multi-Purpose Cart".

FIELD OF THE INVENTION

The present invention relates to wheeled carts for transporting supplies, and in particular to a cart that is easily assembled at an activity site for organizing, transporting, and utilizing gear and supplies associated with an activity such as fishing.

BACKGROUND OF THE INVENTION

Carts, wagons and like wheeled small cargo units have been used for a variety of personal activities requiring goods, gear and other paraphernalia between locations. Oftentimes, the units are designed for alternative purposes and are not well suited for the specific needs of the moment. Although wagons, wheelbarrows and utility carts may be used for other activities, they are normally not intended or configured for organizing and transporting specific items. This is particularly a problem in adapting such units for fishing or like activities wherein the materials must be manually transported from a vehicle to a shore or pier location.

Fishing gear and supplies generally includes a variety of fishing rods, a tackle box, a cooler and bait supplies as well as personal items. The varying lengths, shapes and sizes present difficulty in packing and stable transportation to and from the fishing site. At the site the gear and supplies are not organized for immediate use and must be deployed as individual items. Further the carriers are available as fully assembled units making transportation by ordinary vehicles difficult.

In view of the foregoing, it is an object of the present invention to provide a cart for carrying in organized fashion supplies related to an activity.

Another object of the invention is to provide a general-purpose cart that may be readily transported in ordinary vehicles, quickly assembled at an arrival site, and conveniently towed to a desired activity site.

A further object of the invention is to provide a multiple purpose cart that can be compactly stored and transported and reassembled for use in transporting elongated articles, bulky containers and specialty items.

Yet another object of the invention is to provide a wheeled fishing cart that may be assembled on site and has discrete locations for poles, tackle, bait, coolers and related supplies.

BRIEF SUMMARY OF THE INVENTION

The foregoing objects are accomplished by the present invention with a multipurpose cart that can be used for such sundry purposes as a garden cart, a produce cart, a beach cart, a party cart, fishing pier cart, a surf fishing cart, a general utility cart and the like. Additionally, when being stored, being transported in a small vehicle and for other reasons, the cart component including stabilizing feet, a work station, a towing handle and the tires can all be quickly assembled for use and readily disassembled and place inside the frame of the cart for compact storage, compact transport in a vehicle and the like. The cart includes a transportation compartment for the cooler, tackle box and supplies, and a plurality of peripheral vertical sleeves for carrying the fishing rods. The work station includes a cutting board for cleaning and baiting purposes. The sleeves may also be used for use during active fishing in lieu of sand spikes. The footrests firmly support the cart on-site and allow the operator to use the frame and/or cooler as a seat. The cart allows all supplies to be organized for immediate use without unpacking. Accordingly it can be seen that the present invention provides an extremely versatile, multi-purpose cart that can be quickly converted to a compact condition for storage and/or transport and can just as readily be reassembled for use. The cart may be also be used for general purpose use for rakes, hose, shovels, etc., bales of hay, bags of mulch and transportation of other bulky or difficult to transport items.

DESCRIPTION OF THE DRAWINGS

The above and other objects and advantages of the present invention will become apparent upon reading the following detailed description taken in conjunction with the accompanying drawings in which:

FIG. 6A is a disassembled side view of the work table before installation on the cart;

FIG. 6B is an assembled side view of the work table installed on the cart; and

DETAILED DESCRIPTION OF THE PREFERRED EMBODIMENTS

Figure 1:
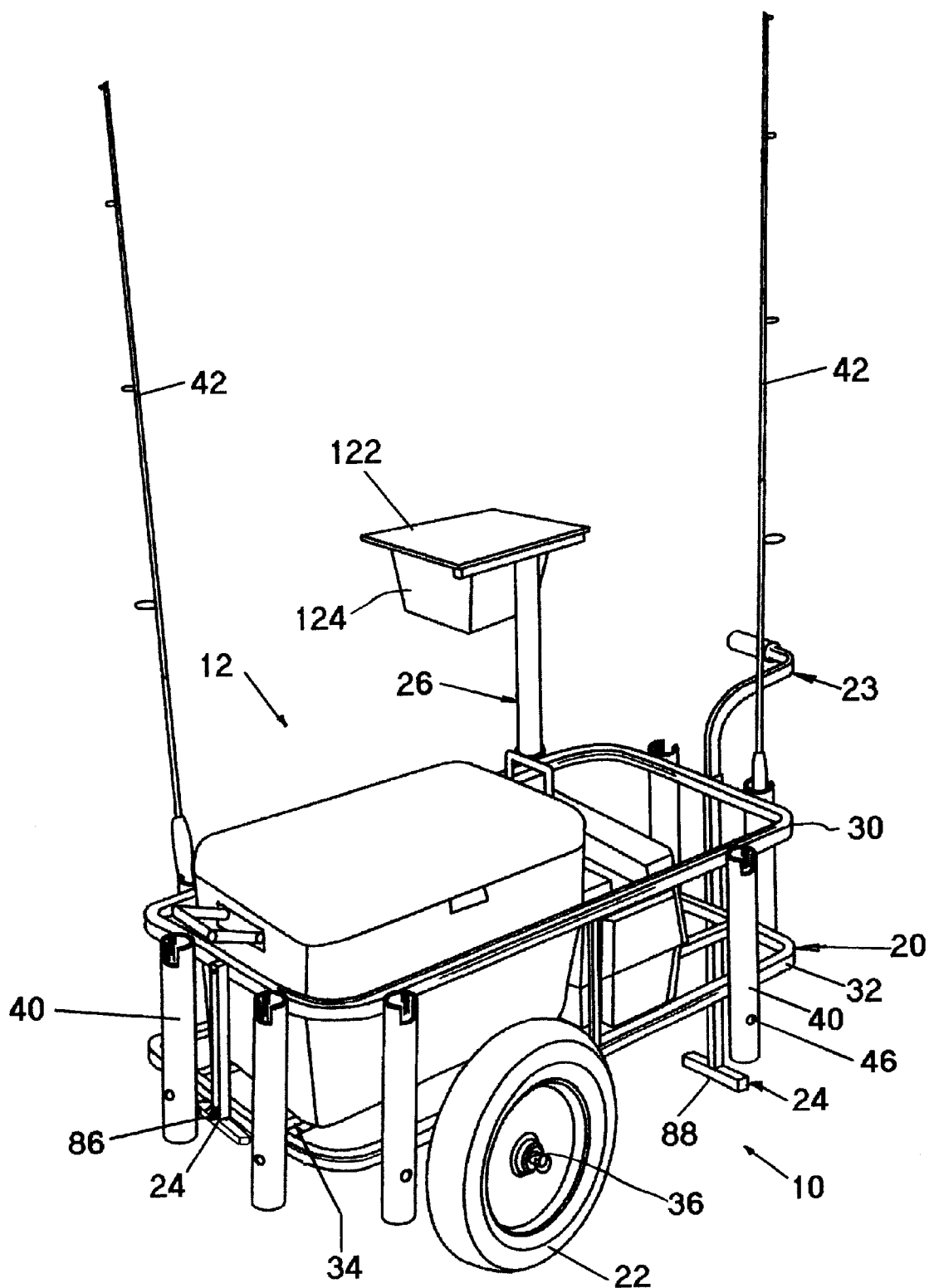
FIG. 1 is a perspective view of a multi-purpose cart in accordance with an embodiment of the invention carry gear and supplies.

Referring to the drawings for the purpose of describing the preferred embodiment and not for limiting same, FIG. 1 illustrates a multi-purpose cart 10 for organizing, transporting and utilizing various gear, supplies and paraphernalia, collectively numbered 12, associated with an activity such as a sporting occasion, and in particular a fishing trip like pier fishing. As will hereinafter be described in detail, the cart and associated items may be transported to the desired location as separate component, and the cart thereafter assembled and organized.

Figure 2:
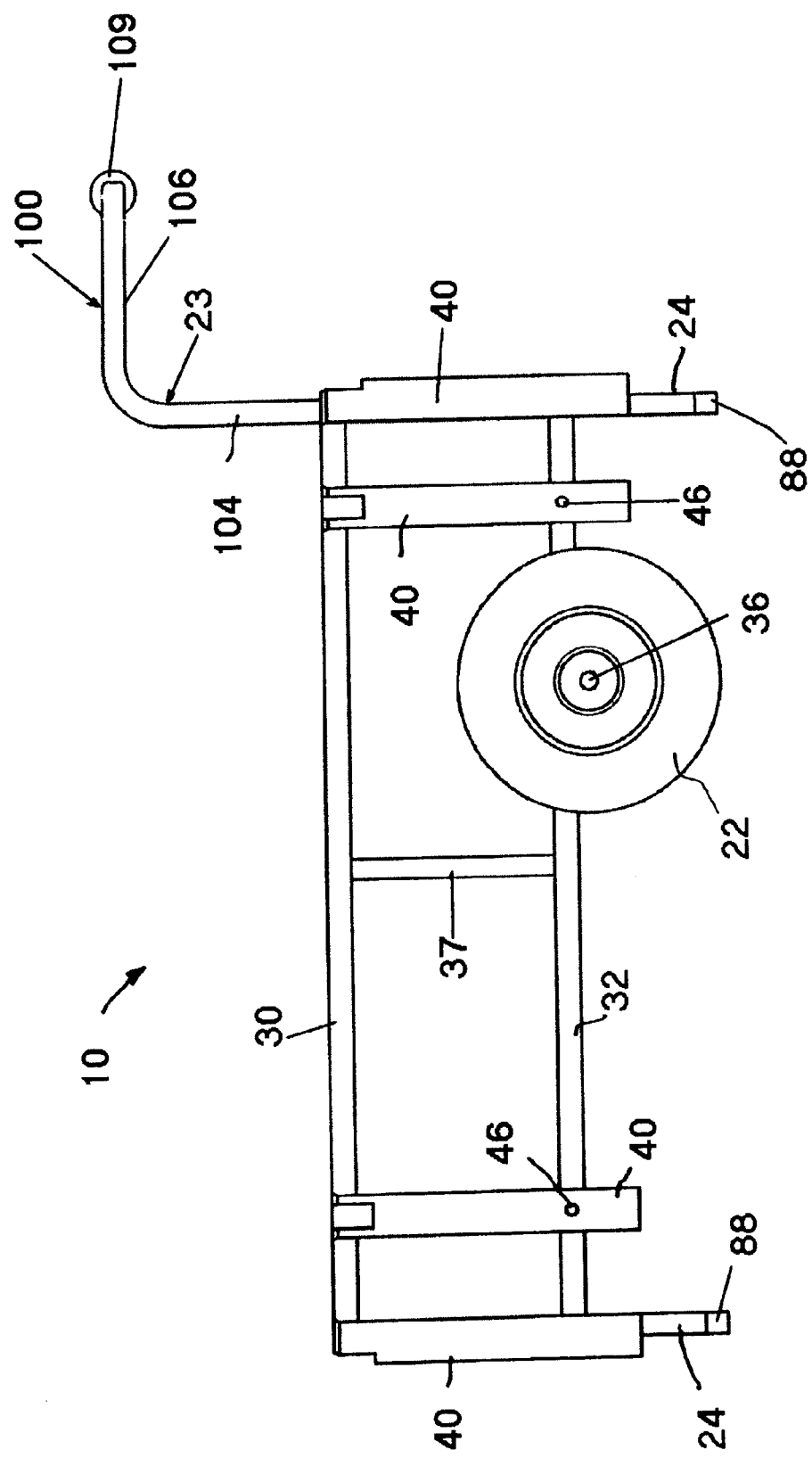
FIG. 2 is side view of the cart of FIG. 1.
Figure 3:
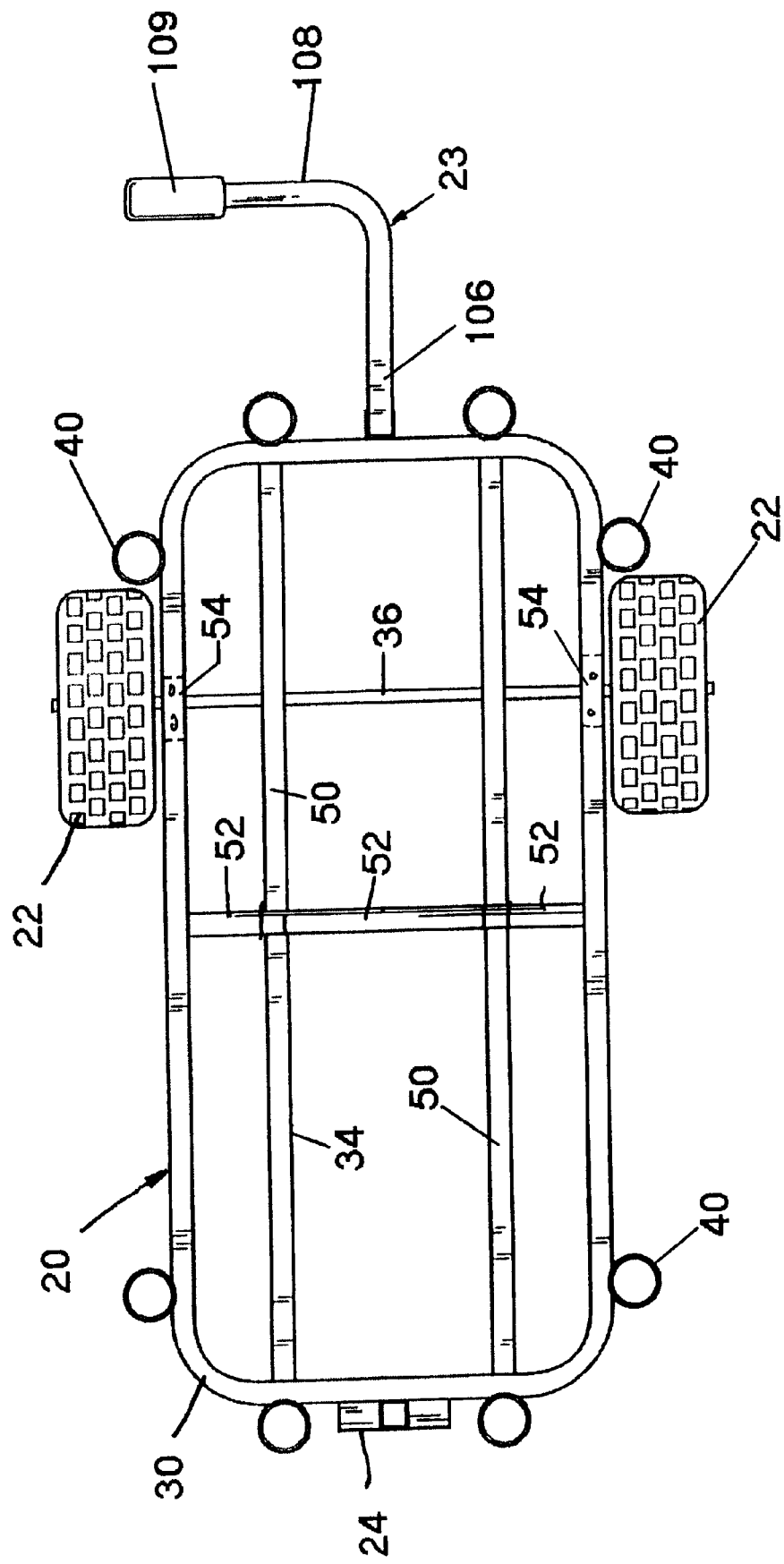
FIG. 3 is a top view of the cart of FIG. 1.

Referring additionally to FIGS. 2 and 3, the cart 10 includes a tubular cargo frame 20 supported by laterally spaced wheels 22 and towed to location with a forward mounted handle 23. At location, the cart 10 is additionally supported by an extendable front and rear footrest assemblies 24. As illustrated, the front footrest 24 is in the lowered stabilizing position and the rear footrest 24 is in the raised transportation position. A work table 26 is releasably carried on the frame 20 as described below.

The frame 20 comprises a top rail 30, and a bottom rail 32 including a base 34 and a transverse axle 36 supporting at the outer ends thereof the wheels 22. The wheels 22 may comprise solid or inflatable tires. The rails 30 and 32 are vertically connected and supported by side bars 37 and the support sleeves 38 for the footrest assemblies 24. A plurality of cylindrical support sleeves 40 are attached about the periphery of the rails 30 and 32. The sleeves 40 provide additional structural rigidity for the frame 20 and are used for holding elongated articles such as fishing poles 42 and the work table 26. The rails 30 and 32 are generally rectangular in shape with rounded corners. The rails 30 and 32 are formed of a suitable structural material, preferably aluminum tubing.

Figure 4:
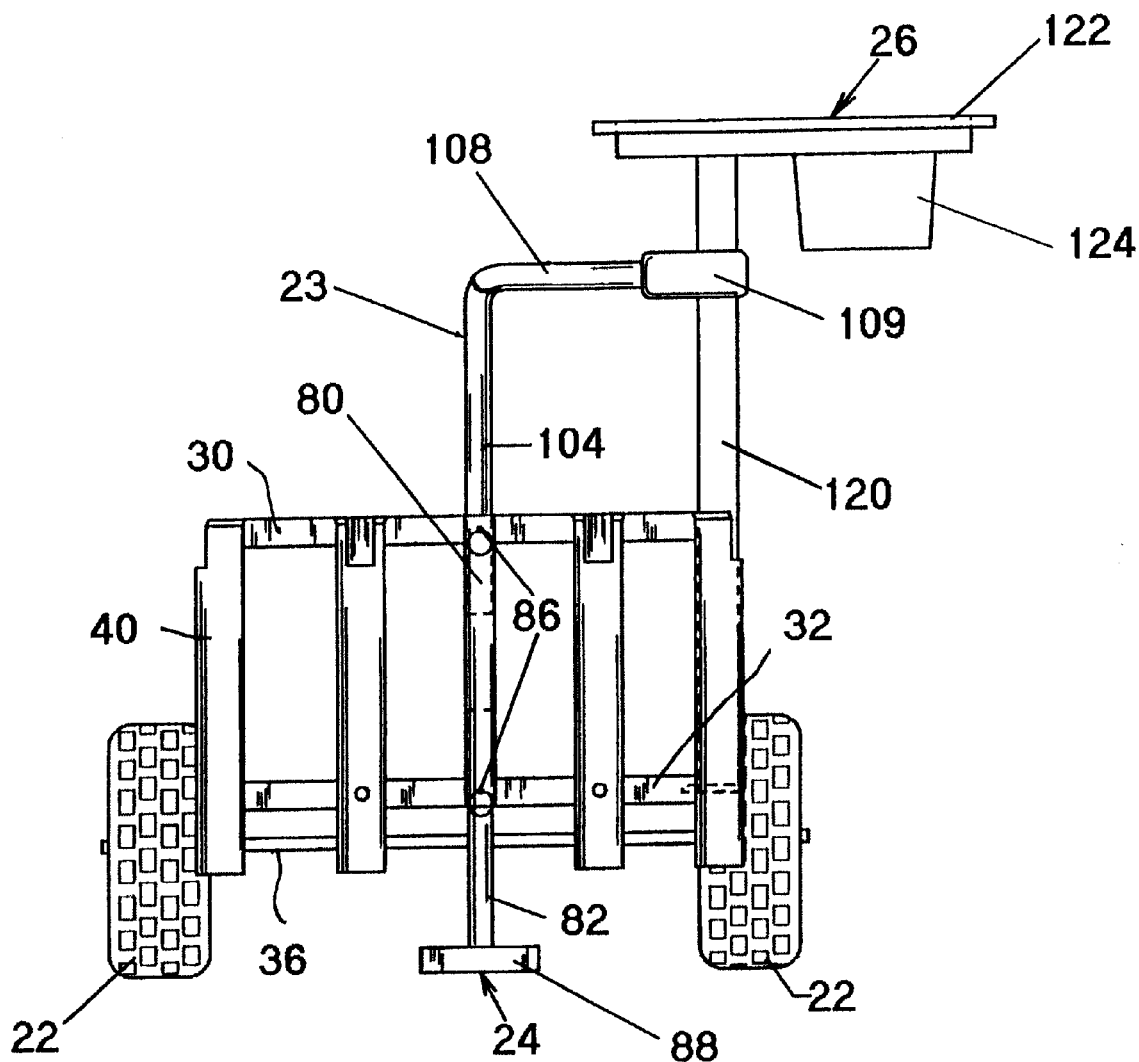
FIG. 4 is a front view of the cart of FIG. 1.

As shown in FIG. 4, the sleeves 40 are connected by weldments at spaced peripheral locations on the rails 30, 32. Additionally, a cross pin 46 extends through each sleeve 40 and is attached to the adjacent lower rail 32. The cross pin 46 is thus effective for limiting downward movement of the poles 42 and the work table 26.

The base 34 includes a pair of laterally spaced longitudinal stringers 50 attached to the front and rear ends of the bottom rail 32, and a plurality of cross braces 52 transversely interconnecting the stringers 50 and the sides of the lower rail 32. The top surfaces of the bottom rail 32, the stringers 50 and the braces 52 lie generally in a common horizontal plane thereby providing a support platform for the gear and supplies, such as the cooler and tackle box illustrated in FIG. 1.

The axle 36 extends transversely across the lower surface of the bottom rail 32 and is connected thereto by brackets 54. The outer ends of the axle 36 extend outwardly of the sides of the lower rail 32 and carry an inner washer 56 located by cross pin 58 and a removable fastener assembly 60 including an outer washer 62 and a split ring 64 releasably captured in cross hole 66. The axle 36 is preferably a cylindrical rod having a telescopic rotating fit with the center bore of the wheel 22 whereby the wheel is maintained on the axle 36 between the washers 56 and 62, as retained therebetween by the split ring 64. For ease of transport and stability, the axle is located slightly rearward of the longitudinal centerline of the frame.

Figure 5A:
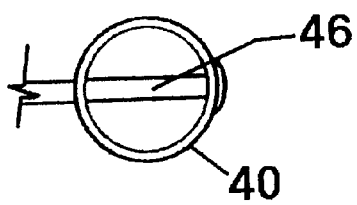
FIG. 5A is an enlarged top view of a support sleeve for the cart.
Figure 5B:
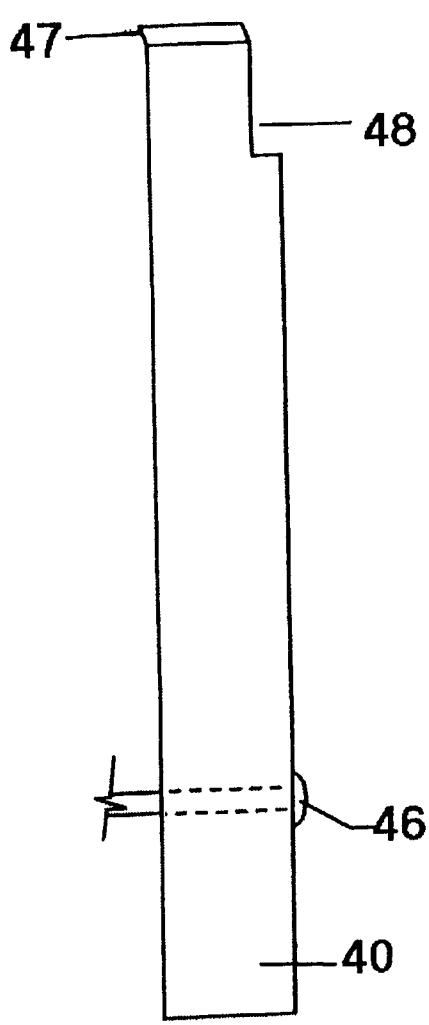
FIG. 5B is an enlarged side view of a support sleeve for the cart.
Figure 5C:
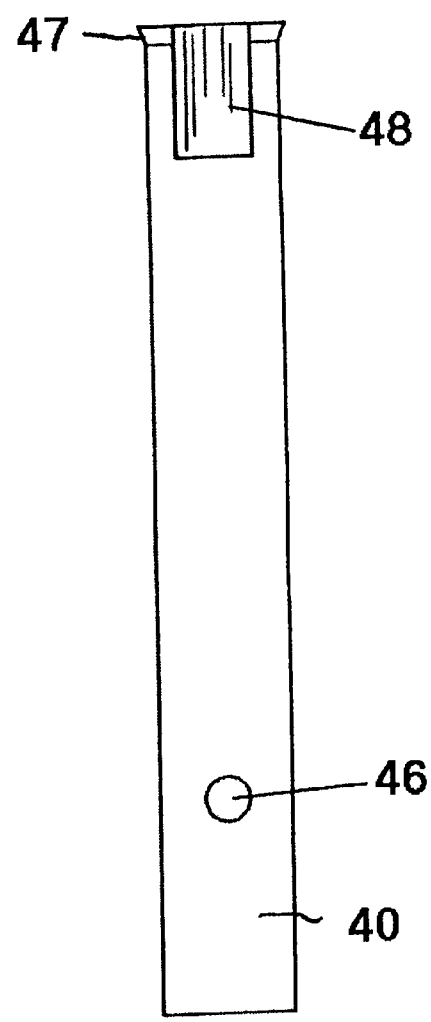
FIG. 5C is an enlarged front view of a support sleeve for the cart.
Figure 7:
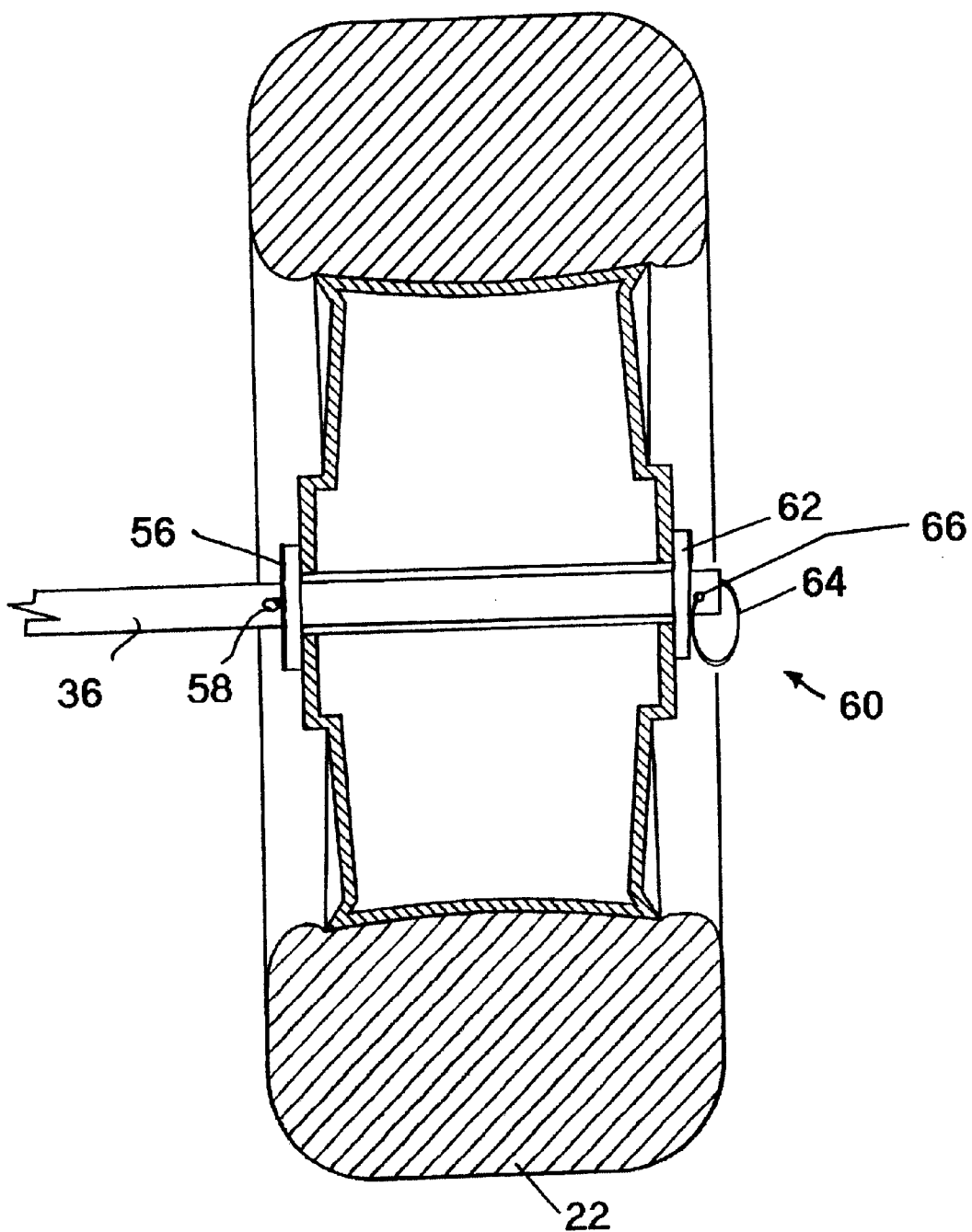
FIG. 7 is a side elevational view of the mounting assembly for the wheels of the cart.

Referring to FIG. 5, the sleeves 40 are cylindrical tubes having ends projecting beyond the respective rails. The upper end 47 of the sleeve 40 is outwardly flared and provided with outwardly and upwardly opening notches 48 for facilitating insertion and removal of the fishing poles and the work station. Preferably, the sleeves are cylindrical tubing of a material compatible with the frame and of sufficient internal diameter to accommodate the telescopic insertion of the desired poles.

The footrest assemblies 24 each include a vertical tubular support sleeve 80 connected by weldments at the front and rear ends of the rails 30, 32 at the longitudinal center line thereof. The support sleeve 80 telescopically adjustably carries a support leg 82 and the towing handle 23. The support sleeve 80 is provided with a plurality of cross holes carrying lock pins 86 for latching the support leg 82 and towing handle 23. The support leg 82 includes a horizontal planar base 88 and has a telescopic fit with the support sleeve 80. The Leg 82 includes a cross hole for alignment with the holes in the support sleeve for thereby receiving the lock pins 86 to circumferentially and axially position the base with respect to the frame 20 and horizontally orient the cargo base 34. Deployed, the footrest assemblies 24 provide stability in varying terrains and permit the operator to use the cart and/or cooler as a seating platform.

The towing handle 23 includes an L-shaped support shaft 100 having a lower leg 104 and upper leg 106, and a laterally extending handle bar 108. The lower leg 104 is telescopically received at the top end of the support sleeve 80. The upper leg 106 is horizontally disposed and projects forwardly of the frame 20. The handle bar 108 is provided with a handle grip 109 for gripping by an operator. It will be apparent that other suitable handle arrangements may be provided, such as double handles integral with the support shaft. The lower leg 104 is provided with axially spaced cross holes, alignable with the cross holes in the support sleeve, for variable height orientation of the handle bar 108 and locked in place with the lock pin 86. Further, the cart may be provided, in lieu of or in addition to, a trailer hitch or connector to permit the cart to be transported behind a motorized vehicle such as a small powers vehicles such as lawn mowers and all terrain vehicles.

The work table 26 includes a tubular support shaft 120 carrying at the upper end thereof a work platform 122. The work platform 122 is sized to provide the use with a work surface for various activities. The work platform 122 may be aperatured and carry a container 124 for holding bait or other loose supplies. The support shaft 120 is telescopically insertable into a desired sleeve 40. The lower end of the shaft 120 includes diametric notches 126 for orienting the work table 22 on the cross pin 46 at the frame.

To stabilize the cart 10 of the present invention when it is not being moved, such as during loading and unloading or used for purposes such as fishing, etc., the foot assemblies can be lowered as shown in FIGS. 2 and 4. Thus, the footrest assemblies 24, and the wheels 22 provide a very stable non-tipping platform. If the cart has a cooler, a tackle box or the like adjacent the rear of the cart with the rear foot down, it can actually be used as a seat.

The cart may obviously be configured in different sizes and shapes dependent on the desired application. For fishing activities, a frame of about 2 feet in width and 3 to 4 feet in length has been found to accommodate conventional gear and supplies, such as coolers, tackle boxes and like gear As illustrated, eight sleeves are provided for handling the poles and work table. A greater or lesser number may be incorporated as required.

For storage and vehicle transportation, the cart may be disassembled into separate components. The work table, support legs, handle and wheels may be removed as stored on the frame bed for transporting. At the site, the wheels 22 are disposed over the axle 36 and locked in place with the split rings 64. The support legs 82 is inserted into the support sleeve and locked in place with lock pin at the desired or elevated position. The handle is mounted on the support sleeve and locked thereto by lock pin 86. The wheels 22 are assembled on the axle 36 and locked into place by the fastener assembly 60. The base is loaded with the gear and poles disposed in the sleeve 20. The work table may also be inserted into the associated support sleeve 40 and stowed at either an inboard or outboard position. After towing to the desired site, the support legs and work table may be adjusted as required. Similarly, after completion of the fishing activity, the above procedures may be reversed for compact storage and transportation.

Having thus described a presently preferred embodiment of the present invention, it will now be appreciated that the objects of the invention have been fully achieved, and it will be understood by those skilled in the art that many changes in construction and widely differing embodiments and applications of the invention will suggest themselves without departing from the sprit and scope of the present invention. The disclosures and description herein are intended to be illustrative and are not in any sense limiting of the invention, which is defined solely in accordance with the following claims.

What is claimed:

1. A cart for transporting fishing gear and supplies, comprising a bottom tubular rail of generally rectangular configuration; a base comprising spaced tubular members attached to said bottom tubular rail and forming a horizontal platform for supporting said gear and supplies; a single axle member extending transversely of and attached to said base on a rear portion thereof, said axle member having outer ends projecting laterally outwardly of said base; diametral holes formed in said outer ends; rotatable wheels releasably carried at said outer ends of said axle member inwardly of said holes; removable fasteners extending through said holes to retain said wheels on said outer ends; a plurality of vertical cylindrical sleeves exteriorly connected at lower ends at spaced locations to said bottom rail; a top tubular rail of generally rectangular configuration vertically spaced above and vertically overlying said bottom tubular rail and attached to upper ends of said cylindrical sleeves; a front tubular support sleeve connected to said rails at the front of said base; an L-shaped shaft member having a lower end telescopically received in said front tubular support sleeve and an upper end extending forwardly thereof; a handle member transversely connected to said upper end; first releasable fastener means for releasably connecting said lower end of said shaft member to said front tubular support sleeve; a front support assembly having a transverse ground engaging leg and an upwardly extending leg telescopically received in a lower end of said front tubular support sleeve and movable between a raised and a lowered position; second releasable fastener means for selectively maintaining said front support assembly in said raised or said lowered position whereby said cart may be readily assembled for use and disassembled for compact storage and transportation.

2. The cart as recited in claim 1 including an accessory platform, said platform having a horizontal work surface and a vertical support shaft extending downwardly from said work surface and telescopically received in one of said sleeves.

3. The cart as recited in claim 2 wherein said sleeves include cross pins at a lower portion thereof for vertically positioning fishing poles and said accessory platform.

4. The cart as recited in claim 3 including detent means between said sleeve and said accessory platform for orienting the circumferential position thereof.

5. the cart as recited in claim 2 wherein the said work surface is provided with a receptacle.

6. The cart as recited in clam, 1 including a rear tubular support sleeve connected to said rails at the rear of said base; a rear support assembly having a transverse ground engaging leg and an upwardly extending leg telescopically received in a lower end of said rear tubular support sleeve and movable between a raised and a lowered position; third releasable fastener means for selectively maintaining said rear support assembly in said raised or said lowered position.

7. The cart as recited in claim 6 wherein said releasable fastener means include locking pins operative between said tubular support sleeves and said support assemblies for selectively establishing vertical positions therefore.

8. The cart as recited in claim 1 wherein said removable fasteners are split rings.

* * * * *